(12) United States Patent
Gopinath Gowda

(10) Patent No.: US 12,205,262 B2
(45) Date of Patent: Jan. 21, 2025

(54) METHODOLOGY FOR HEIGHT MEASUREMENT IN PNEUMATIC DEICER BOOTS

(71) Applicant: Goodrich Corporation, Charlotte, NC (US)

(72) Inventor: Anvith BG Gopinath Gowda, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 55 days.

(21) Appl. No.: 18/323,642

(22) Filed: May 25, 2023

(65) Prior Publication Data

US 2024/0331123 A1    Oct. 3, 2024

(30) Foreign Application Priority Data

Mar. 28, 2023  (IN) .............................. 202311022607

(51) Int. Cl.
| | | |
|---|---|---|
| *G06T 7/00* | (2017.01) | |
| *G06T 7/60* | (2017.01) | |
| *B64D 15/16* | (2006.01) | |

(52) U.S. Cl.
CPC ............ *G06T 7/0002* (2013.01); *G06T 7/60* (2013.01); *B64D 15/166* (2013.01)

(58) Field of Classification Search
CPC ........ G06T 7/0002; G06T 7/60; B64D 15/166
USPC .......................................................... 348/125
See application file for complete search history.

(56) References Cited

U.S. PATENT DOCUMENTS

| | | | | |
|---|---|---|---|---|
| 3,720,388 A | * | 3/1973 | Kaatz ................... | B64D 15/166 244/134 A |
| 4,690,353 A | * | 9/1987 | Haslim ................ | B64D 15/163 318/116 |
| 5,890,677 A | * | 4/1999 | Guillot ................. | B64D 15/166 244/134 A |
| 6,736,611 B2 | | 5/2004 | Putt et al. | |
| 9,598,176 B2 | | 3/2017 | Giamati | |
| 10,640,217 B2 | | 5/2020 | Botura et al. | |
| 2013/0113926 A1 | | 5/2013 | Chen et al. | |
| 2016/0009400 A1 | | 1/2016 | English et al. | |

(Continued)

FOREIGN PATENT DOCUMENTS

| | | |
|---|---|---|
| CN | 101430195 B | 8/2010 |
| CN | 105514904 A | 4/2016 |

(Continued)

OTHER PUBLICATIONS

Martin et al., Advanced Pneumatic Impulse Ice Protection System (PIIP) for Aircraft. 2012, J. Aircraft, vol. 29, No. 4, Engineering Notes, pp. 714-716 (Year: 2012).*

(Continued)

*Primary Examiner* — Marnie A Matt
(74) *Attorney, Agent, or Firm* — CANTOR COLBURN LLP

(57) ABSTRACT

The present disclosure provides for methodologies for height measurement in pneumatic deicer boots for aircraft, and related models, systems and methods of use. More particularly, the present disclosure provides for methods, models, systems and applications to detect the life or failure of pneumatic deicer boots for aircraft. A method for detecting the life or failure of pneumatic deicer boots for aircraft is provided.

20 Claims, 4 Drawing Sheets

(56) References Cited

U.S. PATENT DOCUMENTS

| | | | | |
|---|---|---|---|---|
| 2016/0214726 A1* | 7/2016 | Giamati | ................. | G01R 31/54 |
| 2017/0129622 A1* | 5/2017 | Giamati | ................. | B64D 45/00 |
| 2019/0016467 A1* | 1/2019 | Botura | ..................... | F02C 7/04 |

FOREIGN PATENT DOCUMENTS

| | | |
|---|---|---|
| CN | 103196380 B | 6/2016 |
| CN | 106649598 A | 5/2017 |
| CN | 106595551 B | 1/2019 |
| EP | 3415435 A1 | 12/2018 |
| EP | 3050804 B1 | 3/2019 |
| GB | 2355243 A | 4/2001 |

OTHER PUBLICATIONS

Search Report issued in European Patent Application No. 24165679.2; Application Filing Date Mar. 22, 2024; Date of Mailing Aug. 12, 2024 (7 pages).

\* cited by examiner

Inflation State

Deflation State

METHODOLOGY FOR HEIGHT MEASUREMENT IN PNEUMATIC DEICER BOOTS

CROSS-REFERENCE TO RELATED APPLICATIONS

This application claims the benefit of Indian application Ser. No. 202311022607 filed Mar. 28, 2023, the disclosure of which is incorporated herein by reference in its entirety.

TECHNICAL FIELD

The present disclosure relates to methodologies for height measurement in pneumatic deicer boots for aircraft, and related models, systems and methods of use.

BACKGROUND

In general, pneumatic deicing boots are a category of ice protection systems installed on aircraft surfaces to facilitate mechanical deicing of accumulated ice on aircraft wings, propellers, wing tips, etc. Deicing boots are commonly installed on the aircraft wings leading edges and control surfaces (e.g., horizontal, and vertical stabilizer), propellers, wing tips, etc. These are the areas which favor ice to accumulate, and any contamination can severely affect the aircraft's performance increasing drag, and at times can become catastrophic.

Due to continuous use of pneumatic deicers on an aircraft under icing conditions, the deicer can fail abruptly during operation. This can lead to, depending on the extent of the failure, an area of the pneumatic deicer becoming inefficient to expel accumulated ice on the control surface of an aircraft where such pneumatic deicers are mounted. This can turn catastrophic if the failure occurs in larger portions of the pneumatic deicer. Hence, early detection of the failure is desired.

BRIEF DESCRIPTION

The present disclosure provides for methodologies for height measurement in pneumatic deicer boots for aircraft, and related models, systems and methods of use. More particularly, the present disclosure provides for methods, models, systems and applications to detect the life or failure of pneumatic deicer boots for aircraft.

The present disclosure provides for a method for detecting life or failure of pneumatic deicer boots including positioning a colored strip on a pneumatic deicer boot, and installing the pneumatic deicer boot on an aircraft, detecting variation of a width of the colored strip via a camera at pre-determined time intervals, plotting and correlating the width of the colored strip against an inflation or deflation height of a tube of the pneumatic deicer boot utilizing a pre-tested graph to determine the height of inflation or deflation of the tube at the pre-determined time intervals, and utilizing the height of inflation or deflation of the tube at the pre-determined time intervals to detect the life or failure of pneumatic deicer boot.

In addition to one or more of the features described, or as an alternative to any of the foregoing embodiments, the camera is positioned inside the aircraft.

In addition to one or more of the features described, or as an alternative to any of the foregoing embodiments, the colored strip includes a first color and the pneumatic deicer boot includes a second color that is different than the first color.

In addition to one or more of the features described, or as an alternative to any of the foregoing embodiments, the pneumatic deicer boot is positioned on a wing of the aircraft.

In addition to one or more of the features described, or as an alternative to any of the foregoing embodiments, the colored strip is positioned on a stitched line or area of the tube.

In addition to one or more of the features described, or as an alternative to any of the foregoing embodiments, the colored strip includes a glued strip and/or comprises paint.

In addition to one or more of the features described, or as an alternative to any of the foregoing embodiments, where determining the height of inflation or deflation of the tube at the pre-determined time intervals comprises contactless inflation or deflation height measurement.

In addition to one or more of the features described, or as an alternative to any of the foregoing embodiments, the camera is a high definition camera.

In addition to one or more of the features described, or as an alternative to any of the foregoing embodiments, the colored strip includes a plurality of colors.

In addition to one or more of the features described, or as an alternative to any of the foregoing embodiments, the pneumatic deicer boot includes a stretchable fabric and a non-stretchable fabric.

The present disclosure provides for a pneumatic deicer boot assembly including a colored strip positioned on a pneumatic deicer boot, the pneumatic deicer boot installed on an aircraft, a camera positioned on the aircraft, the camera configured to detect variation of a width of the colored strip at pre-determined time intervals, and where variation of the width of the colored strip at the pre-determined time intervals operates to determine a height of inflation or deflation of a tube of the pneumatic deicer boot at the pre-determined time intervals to detect the life or failure of the pneumatic deicer boot.

In addition to one or more of the features described, or as an alternative to any of the foregoing embodiments, the camera is positioned inside the aircraft.

In addition to one or more of the features described, or as an alternative to any of the foregoing embodiments, the colored strip includes a first color and the pneumatic deicer boot includes a second color that is different than the first color.

In addition to one or more of the features described, or as an alternative to any of the foregoing embodiments, the pneumatic deicer boot is positioned on a wing of the aircraft.

In addition to one or more of the features described, or as an alternative to any of the foregoing embodiments, the colored strip is positioned on a stitched line or area of the tube.

In addition to one or more of the features described, or as an alternative to any of the foregoing embodiments, the colored strip includes a glued strip and/or comprises paint.

In addition to one or more of the features described, or as an alternative to any of the foregoing embodiments, where determining the height of inflation or deflation of the tube at the pre-determined time intervals comprises contactless inflation or deflation height measurement.

In addition to one or more of the features described, or as an alternative to any of the foregoing embodiments, the camera is a high definition camera.

In addition to one or more of the features described, or as an alternative to any of the foregoing embodiments, the colored strip includes a plurality of colors.

In addition to one or more of the features described, or as an alternative to any of the foregoing embodiments, the pneumatic deicer boot includes a stretchable fabric and a non-stretchable fabric.

The above described and other features are exemplified by the following figures and detailed description.

Any combination or permutation of embodiments is envisioned. Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
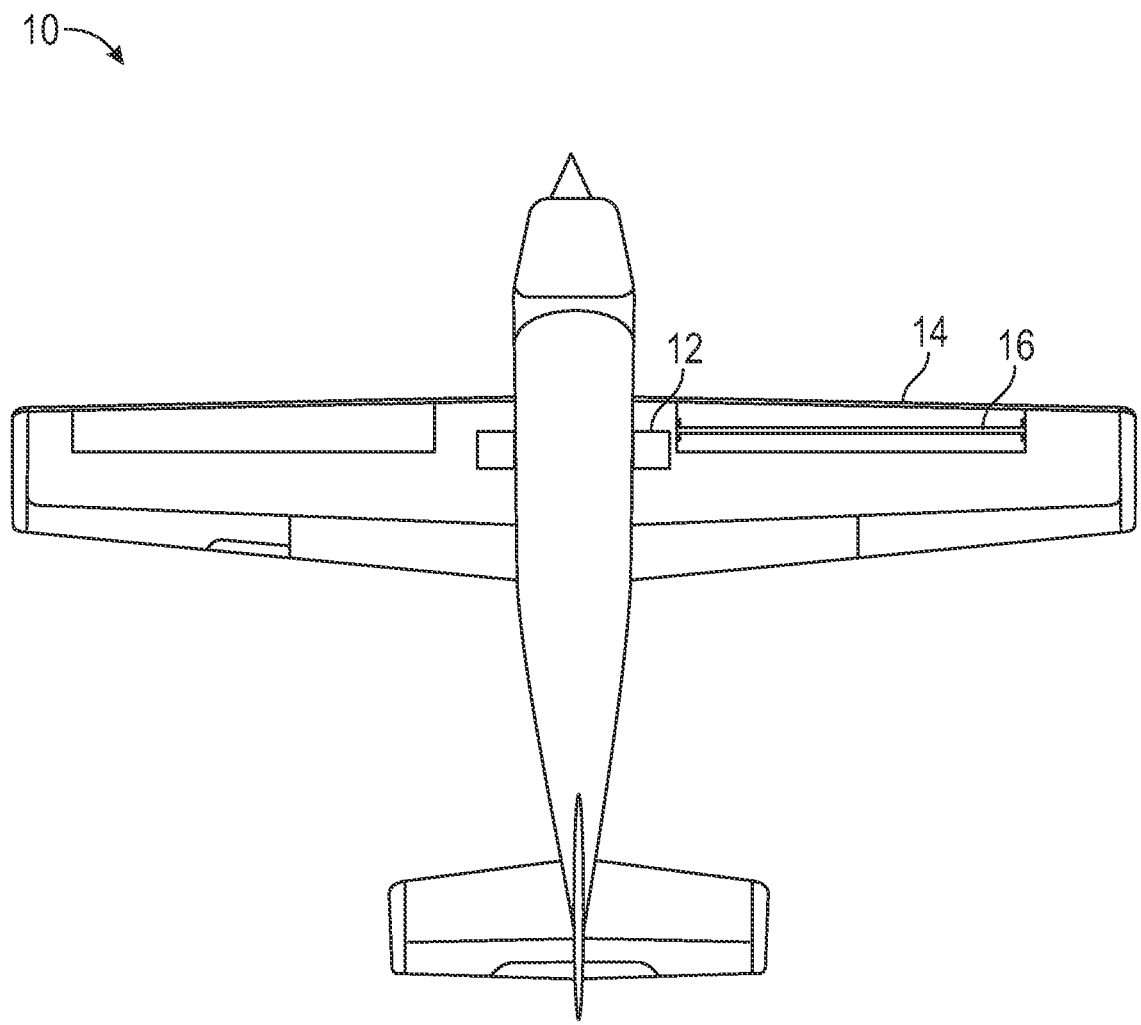
Figure 2:
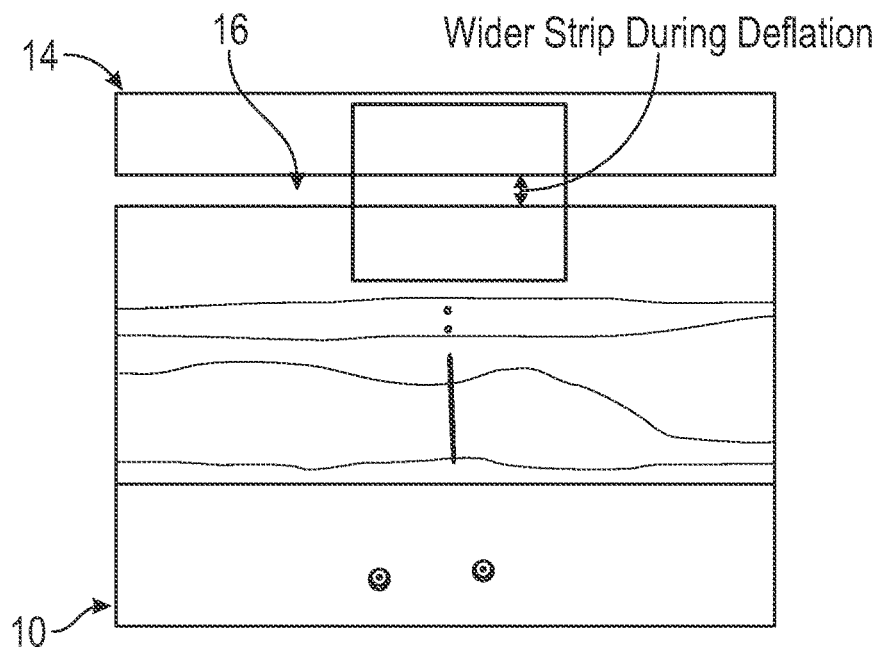
Figure 3:
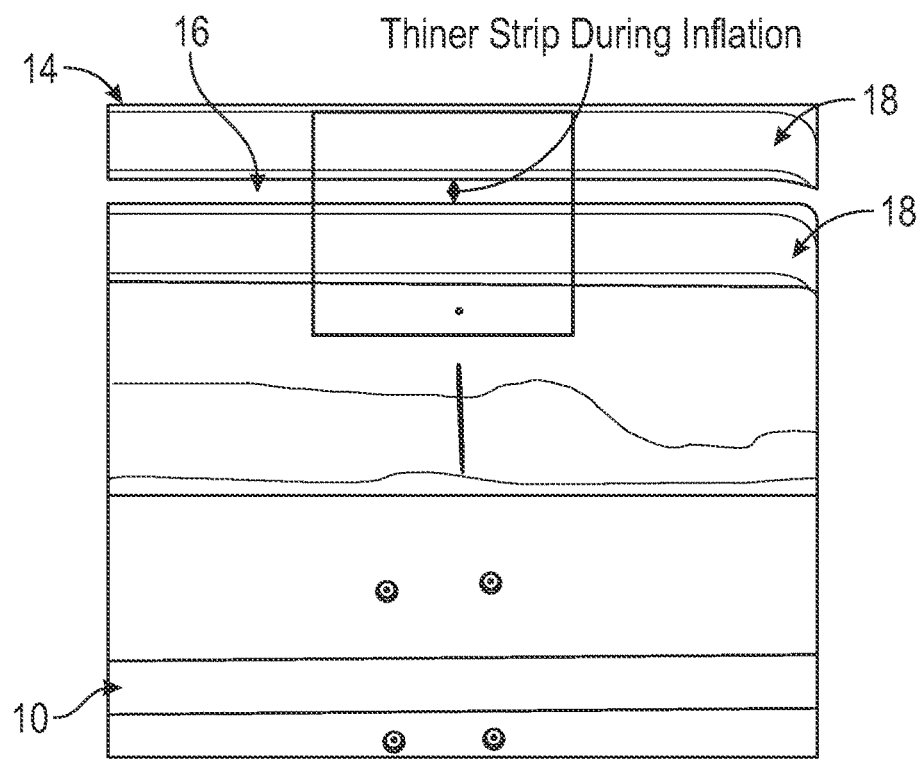
Figure 4:
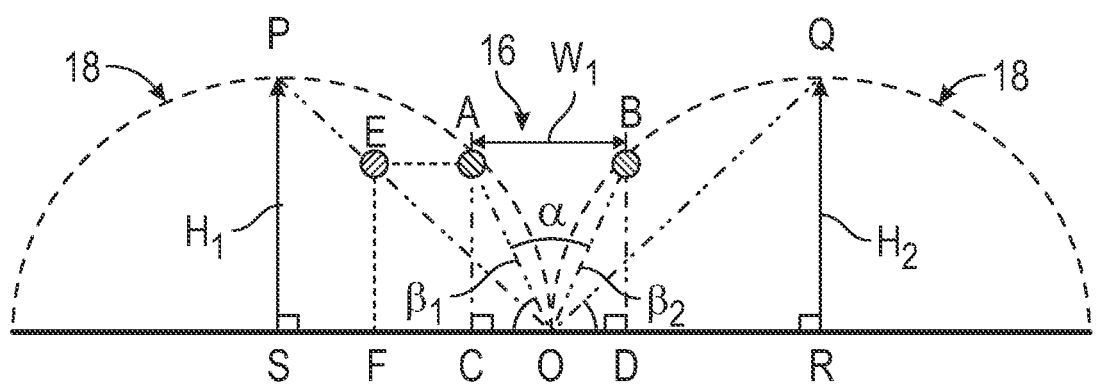
Figure 5:
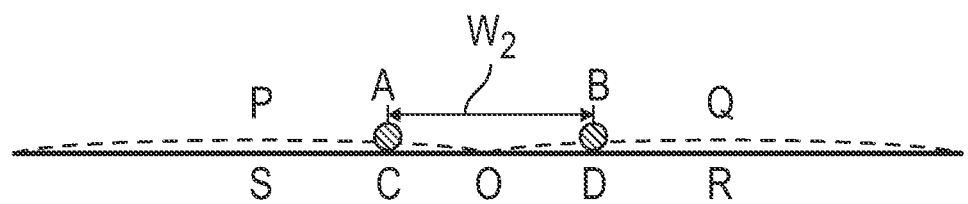
Figure 6:
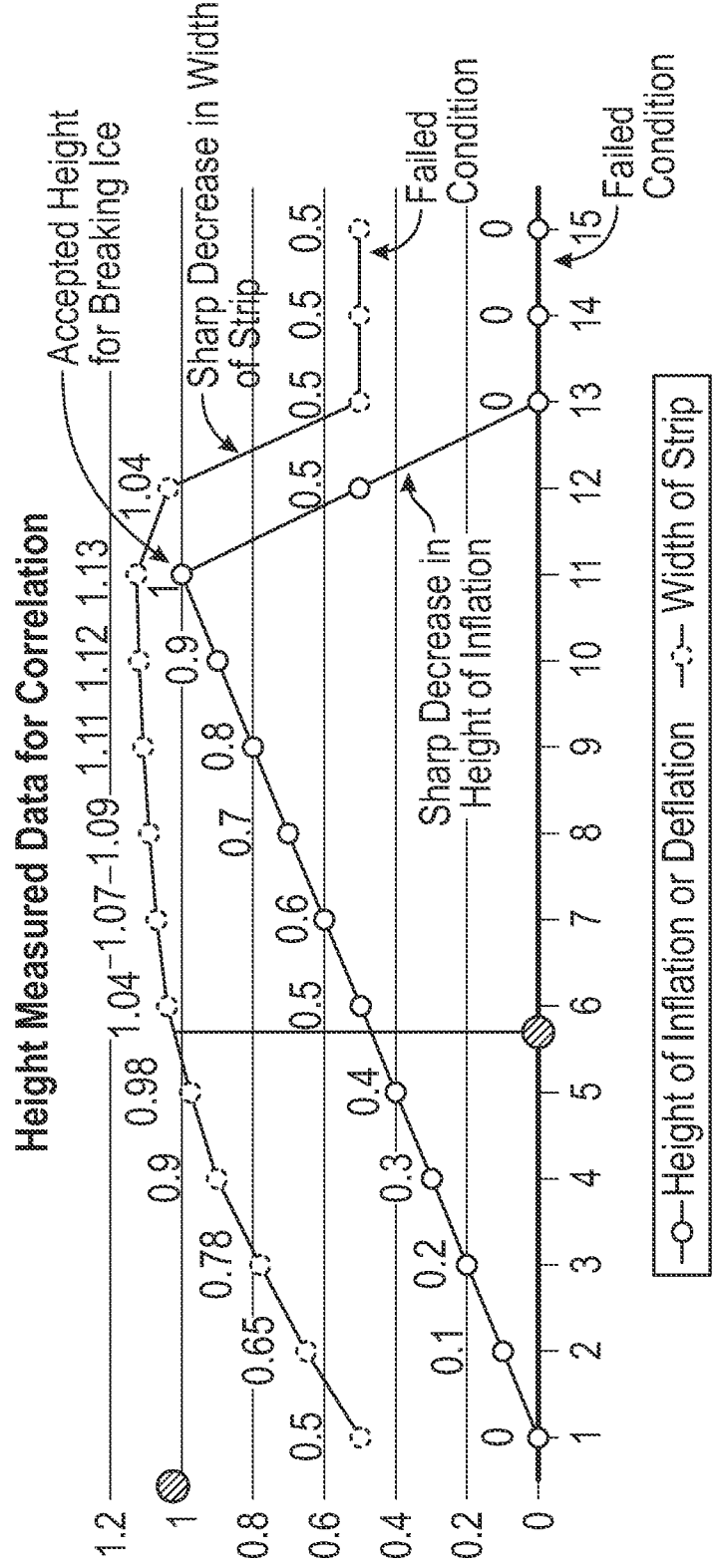

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a top view of an example aircraft having a pneumatic deicer boot of the present disclosure;

FIG. 2 is a partial top view of an example pneumatic deicer boot of the present disclosure, the pneumatic deicer boot in the deflated position;

FIG. 3 is a partial top view of an example pneumatic deicer boot of the present disclosure, the pneumatic deicer boot in the inflated position;

FIG. 4 is a height detection calculation schematic for an example pneumatic deicer boot of the present disclosure, the pneumatic deicer boot in the inflated position;

FIG. 5 is a height detection calculation schematic for an example pneumatic deicer boot of the present disclosure, the pneumatic deicer boot in the deflated position; and FIG. 6 is a height detection correlation plot for an example pneumatic deicer boot of the present disclosure.

DETAILED DESCRIPTION

The example embodiments disclosed herein are illustrative of methods for detecting life or failure of pneumatic deicer boots for aircraft, and systems of the present disclosure and applications/techniques thereof. It should be understood, however, that the disclosed embodiments are merely examples of the present disclosure, which may be embodied in various forms. Therefore, details disclosed herein with reference to example methods and associated processes/techniques of fabrication/assembly and use are not to be interpreted as limiting, but merely as the basis for teaching one skilled in the art how to make and use the methods, systems and assemblies of the present disclosure.

The present disclosure provides for methodologies for height measurement in pneumatic deicer boots for aircraft, and related models, systems and methods of use. More particularly, the present disclosure provides for methods, models, systems and applications to detect the life or failure of pneumatic deicer boots for aircraft.

Current practice provides that pneumatic deicer boots can be made of two types of coated fabrics, a stretchable fabric and a non-stretchable fabric. The stretchable fabric stretches at regular intervals based on the pneumatic deicer design.

In operation or service, two extreme cases/conditions can be observed in pneumatic deicer boots—an inflated condition and a deflated condition. The inflated condition is when the air is filled in the pneumatic deicer and the tubes are blown to the maximum extent. This is the case when ice gets broken from the surface of the deicer boot.

The deflated condition is when vacuum is created in the tubes of the pneumatic deicer boot. The functional capability of the deicer boot depends on the height of inflation and deflation of the pneumatic deicer tubes. Knowing the height helps one to understand the air pressure in the deicer tubes and therefore the real time performance capability of the deicer boot.

The present disclosure provides a method of measuring the height of inflation and deflation in a pneumatic deicer boot using image processing of a contrast colored deicer.

An example method or process can be achieved by image processing using a camera which is focused on the aircraft wing or the like, and with the contrast colored pneumatic deicers on the aircraft. The stitched lines or areas of the pneumatic deicer tubes can be colored with a contrasting color strip or paint. The change in the thickness of this strip is with respect to the air pressure in the respective deicer tubes and is captured by the camera, and using a programming language the correlation between the strip thickness and the height of inflation and/or deflation is derived. The inflated and/or deflated tube height is measured based on pre-test data.

For easy detection of the difference in the strip thickness, the color of the strip and the rest of the deicer surface should be of different colors. In image processing, the hardware based color models mainly used are: RGB (red, green, blue), CMYK (cyan, magenta, yellow, black), and HSI (hue, saturation, intensity). The RGB (red, green, blue) color system is used mainly in color monitors and video cameras. The contrast is defined as the difference between the highest and lowest intensity value of the image. The contrast between the stitched edge of the pneumatic deicer and the tubes can be done using glued strips or paint or another manufacturing process.

The deicer tube height measurement works on the principle that when the deicer inflates the contrast colored strip on the edges of the tube or the stitched lines of the deicers changes its form or becomes thinner in the image captured by a camera. Similarly when the deicer deflates the contrast colored strip on the edges of the tube or the stitched lines of the deicers changes its form or becomes thicker in the image captured by a camera.

This difference in the two images—the fully inflated image and the fully deflated image of the pneumatic deicer can be compared to measure the height of inflation and/or deflation that occurred using image processing techniques.

FIG. 1 is a top view of an example aircraft 10 having a pneumatic deicer boot 14 of the present disclosure.

The pneumatic deicer boot 14 includes a contrast colored strip or area 16 (e.g., contrast strips/paint 16), with the pneumatic deicer boot 14 installed on the aircraft.

At least one stitched line or stitched area 16 of at least one pneumatic deicer tube 18 of deicer boot 14 can be colored with a contrasting color strip or paint 16. The change in the thickness of this strip/area 16 is with respect to the air pressure in the deicer tubes 18 and is captured by a camera 12, and using a programming language the correlation between the strip/area 16 thickness and the height of inflation and/or deflation is derived. The inflated and/or deflated tubes 18 height is measured based on pre-test data.

As noted and for easy detection of the difference in the strip 16 thickness, the color of the strip 16 and the rest of the deicer 14 surface should be of different colors. When the deicer 14 inflates, the contrast colored strip 16 on the edges of the tubes 18 or the stitched lines of the deicer 14 changes its form or becomes thinner in the image captured by the camera 12. Similarly, when the deicer 14 deflates the contrast colored strip 16 on the edges of the tubes 18 or the stitched lines of the deicer 14 changes its form or becomes thicker in the image captured by the camera 12. As discussed further below, the difference in the two images (the fully inflated image and the fully deflated image of the pneumatic deicer 14) can be compared to measure the height of inflation and/or deflation that occurred using image processing techniques.

As noted, a camera 12 (e.g., high definition camera 12) can be focused on the deicer 14 such that the variation in the form or width of the strip 16 is detected. The captured images can be sent in real time to a processor or the like. Using a program, the variation in strip thickness or width is measured in the images. The thickness or width of the strip 16 can be plotted against the inflation or deflation height of the respective tube 18 in a pre-tested graph which acts as the baseline values (See FIG. 6). Through correlation, the height of inflation or deflation of each respective tube 18 is measured.

The above mentioned technique can also be used to measure the height of the deicer tube 18 during inflation by correlating the strip 16 thickness or width with the tube 18 height.

Referring now to FIGS. 4 and 5, the distance or width $W_1$ and $W_2$ between the edges A, B of the strip 16 during inflation and deflation conditions of the deicer 14 can be measured.

As shown in FIGS. 4 and 5, the distance or height $H_1$, $H_2$ for the centers P, Q of the two tubes 18 under consideration from surface S, R during inflation and deflation conditions of the deicer 14 can be measured. The distance or width $W_1$ and $W_2$ between the edges A, B of the strip 16 are noted at regular time intervals (in milliseconds), simultaneously the height $H_1$, $H_2$ of inflation and deflation is measured with the help of linear variable differential transformer (LVDT), laser height sensor or any other accurate means. The distance or width $W_1$ and $W_2$ between the edges A, B of the strip 16 and the height $H_1$, $H_2$ of inflation and deflation of the deicer tube 18 are correlated. This method can be repeated for better calibration.

The tube heights $H_1$ and $H_2$ and the distance or width $W_1$ and $W_2$ between the edges A, B of the strip 16 at regular time intervals are plotted, and the height $H_1$, $H_2$ at a given distance or width $W_1$ and $W_2$ between the edges A, B of the strip 16 can be interpolated as shown in FIG. 6. The distances or widths $W_1$ and $W_2$ between the edges A, B of the strip 16 (and distances C to O and D to O) change in value with the change in heights $H_1$ and $H_2$ during inflation and deflation states.

Failure is detected in the pneumatic deicer boot 14 when there is no inflation or the inflation height is not adequate for the deicer 14 to break the ice. In FIG. 6, when there is a sudden drop in the height to zero or to a non-acceptable height for deicing, there will also be a sudden drop in the width of the strip 16. With this indication, the deicer boot 14 needs to be inspected, repaired, and/or replaced. Hence preventive maintenance of the pneumatic deicer 14 is possible with this method, system and assembly.

As such, the present disclosure provides for a new method of using image processing and contrast colored strips 16 in pneumatic deicer boots 14 for height measurement of the pneumatic deicer tubes 18 for detecting life or failure of pneumatic deicer boots 14 for aircraft 10.

There are many benefits of the assemblies, systems and methods of the present disclosure, including, without limitation less space and less equipment required for life prediction of pneumatic de-icers 14; can be used in testing activity; low capital required for full scale manufacturing; contactless inflation or deflation height measurement; camera 12 can be placed or positioned inside the aircraft 10 hence less prone to failure to external environmental conditions; preventive maintenance can be carried out; can be integrated with Internet of Things (IOT) systems; data collected can be used for data analytics; and/or provides opportunity to develop proprietary products.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the assemblies, systems and methods of the present disclosure have been described with reference to example embodiments thereof, the present disclosure is not limited to such example embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for detecting life or failure of pneumatic deicer boots comprising:
    positioning a colored strip on a pneumatic deicer boot, and installing the pneumatic deicer boot on an aircraft;
    detecting variation of a width of the colored strip via a camera at pre-determined time intervals;
    plotting and correlating the width of the colored strip against an inflation or deflation height of a tube of the pneumatic deicer boot utilizing a pre-tested graph to determine the height of inflation or deflation of the tube at the pre-determined time intervals; and
    utilizing the height of inflation or deflation of the tube at the pre-determined time intervals to detect the life or failure of pneumatic deicer boot.

2. The method of claim 1, wherein the camera is positioned inside the aircraft.

3. The method of claim 1, wherein the colored strip includes a first color and the pneumatic deicer boot includes a second color that is different than the first color.

4. The method of claim 1, wherein the pneumatic deicer boot is positioned on a wing of the aircraft.

5. The method of claim 1, wherein the colored strip is positioned on a stitched line or area of the tube.

6. The method of claim 1, wherein the colored strip includes a glued strip and/or comprises paint.

7. The method of claim 1, wherein determining the height of inflation or deflation of the tube at the pre-determined time intervals comprises contactless inflation or deflation height measurement.

8. The method of claim 1, wherein the camera is a high definition camera.

9. The method of claim 1, wherein the colored strip includes a plurality of colors.

10. The method of claim 1, wherein the pneumatic deicer boot includes a stretchable fabric and a non-stretchable fabric.

11. A pneumatic deicer boot assembly comprising:
    a colored strip positioned on a pneumatic deicer boot, the pneumatic deicer boot installed on an aircraft;
    a camera positioned on the aircraft, the camera configured to detect variation of a width of the colored strip at pre-determined time intervals;
    wherein variation of the width of the colored strip at the pre-determined time intervals operates to determine a height of inflation or deflation of a tube of the pneumatic deicer boot at the pre-determined time intervals to detect the life or failure of the pneumatic deicer boot.

12. The assembly of claim 11, wherein the camera is positioned inside the aircraft.

13. The assembly of claim 11, wherein the colored strip includes a first color and the pneumatic deicer boot includes a second color that is different than the first color.

14. The assembly of claim 11, wherein the pneumatic deicer boot is positioned on a wing of the aircraft.

15. The assembly of claim 11, wherein the colored strip is positioned on a stitched line or area of the tube.

16. The assembly of claim 11, wherein the colored strip includes a glued strip and/or comprises paint.

17. The assembly of claim 11, wherein determining the height of inflation or deflation of the tube at the pre-determined time intervals comprises contactless inflation or deflation height measurement.

18. The assembly of claim 11, wherein the camera is a high definition camera.

19. The assembly of claim 11, wherein the colored strip includes a plurality of colors.

20. The assembly of claim 11, wherein the pneumatic deicer boot includes a stretchable fabric and a non-stretchable fabric.

* * * * *